United States Patent Office 3,305,524
Patented Feb. 21, 1967

3,305,524
POLYSILOXANES
John F. Brown, Jr., Schenectady, Christian R. Sporck, Burnt Hills, and Howard A. Vaughn, Jr., Schenectady, N.Y., assignors to General Electric Company, a corporation of New York
No Drawing. Filed Nov. 27, 1962, Ser. No. 240,436
2 Claims. (Cl. 260—46.5)

This application is a continuation-in-part of our now abandoned application Serial No. 160,266, filed December 18, 1961, and assigned to the same assignee as the present invention.

This application is directed to a new class of high molecular weight methylphenylpolysiloxanes and methylalkylphenylpolysiloxanes which are convertible to the solid, cured, elastic state.

High molecular weight linear polydiorganosiloxanes which are convertible to the solid, elastic, cured state and in which the organo groups are all methyl groups are known in the art. While the linear polydiorganosiloxanes in which all of the organo groups are methyl groups are very valuable materials of commerce and cured silicone rubbers prepared therefrom are valuable materials of commerce, these methyl silicone rubbers have several shortcomings. For example, methyl silicone rubbers do not have as high a tensile strength as desired and are not as resistant to the deleterious effect of elevated temperatures or ionizing radiation as desired. Because of these shortcomings of methyl silicone rubbers, commercial acceptance has been gained by a number of silicone rubbers in which the organo groups of the polydiorganosiloxanes from which the rubbers are prepared are both methyl and phenyl groups. While the addition of some phenyl groups to silicone rubber has improved the thermal stability, particularly in oxidizing atmospheres, of the rubber and has improved the resistance of the rubber to the effects of ionizing irradiation, the presence of the phenyl groups has not improved the mechanical properties of the rubber, i.e., the presence of the phenyl group has not significantly improved the tensile strength of the rubber. Materials in which all of the organo groups are phenyl groups have not been accepted in the silicone rubber art since polydiphenylsiloxanes of any reasonably high molecular weight are hard, intractable, crystalline materials rather than elastomers.

The prior art polydiorganosiloxanes in which the organo groups are both methyl and phenyl groups are generally prepared by the rearrangement and condensation of a plurality of cyclic polydiorganosiloxanes. For example, a high molecular weight polysiloxane convertible to the solid, cured, elastic state can be prepared by the rearrangement and condensation of a mixture of octamethylcyclotetrasiloxane and octaphenylcyclotetrasiloxane or a mixture of hexamethylcyclotrisiloxane and hexaphenylcyclotrisiloxane. The resulting materials can be compounded into silicone rubber and the resulting products exhibit the improved thermal stability and resistance to ionizing irradiation imparted by the phenyl group. However, the physical properties, such as tensile strength, of the rubber are not significantly better than the corresponding physical properties of polydimethylsiloxane rubber. In Johannson Patent 2,994,684, there are disclosed copolymers prepared by the rearrangement and condensation of a mixture of hexaphenylcyclotrisiloxane and the cyclic trimer of methylphenylsiloxane. While these copolymers contain a high percentage of silicon-bonded phenyl groups and exhibit the thermal stability and irradiation resistance characteristic of the phenyl group, the copolymers are not useful for conversion to silicone rubber because they are hard, intractable materials.

The present invention is based on our discovery of a new class of polydiorganosiloxanes convertible to the solid, cured, elastic state. These polydiorganosiloxanes are composed of diphenylsiloxane units and either dimethylsiloxane units or other methylalkylsiloxane units with the various siloxane units being present in an ordered arrangement. More particularly, the present invention is directed to high molecular weight diorganosiloxane polymers of the type described above comprising a plurality of repeating units having the formula:

(1) 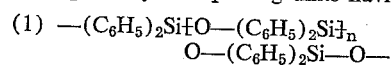

where R is an alkyl radical selected from the class consisting of methyl, ethyl and propyl and $n$ is a whole number equal to from 0 to 1, inclusive.

The high molecular weight polydiorganosiloxanes of Formula 1, which are often hereinafter referred to as "ordered copolymers" are prepared by effecting the rearrangement and condensation of cyclic polydiorganosiloxanes having the formula:

(2) 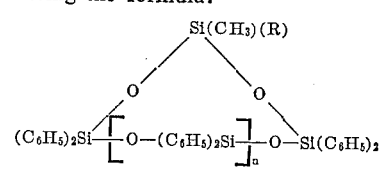

where R and $n$ are as previously defined.

Within the scope of Formula 2 are a number of compounds, namely, 1,1-dimethyl - 3,3,5,5,7,7 - hexaphenylcyclotetrasiloxane having the formula:

(3) 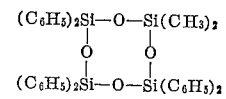

1-methyl - 1 - ethyl - 3,3,5,5,7,7 - hexaphenylcyclotetrasiloxane having the formula:

(4) 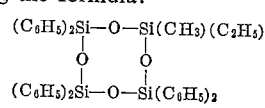

1-methyl-1-propyl - 3,3,5,5,7,7 - hexaphenylcyclotetrasiloxane having the formula:

(5) 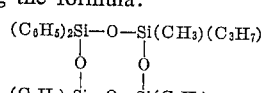

where the propyl group can be either n-propyl or iso-propyl, 1,1-dimethyl-3,3,5,5-tetraphenylcyclotrisiloxane having the formula:

(6) 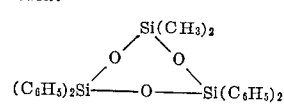

1 - methyl-1-ethyl-3,3,5,5-tetraphenylcyclotrisiloxane having the formula:

(7) 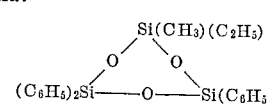

and 1-methyl-1-propyl-3,3,5,5-tetraphenylcyclotrisiloxane having the formula:

(8) 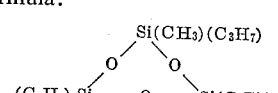

where the propyl group can be either n-propyl or iso-propyl.

The preparation of the cyclotetrasiloxanes described above is described and claimed in the now abandoned copending applications of one of us, Howard A. Vaughn, Jr., Serial No. 160,267, filed December 18, 1961, and application Serial No. 240,441 filed concurrently herewith, both applications being assigned to the same assignee as the present invention. The disclosure of these aforementioned Vaughn applications is incorporated by reference into the present application for the details on the preparation of the aforementioned cyclotetrasiloxanes. The cyclotrisiloxanes described above are described and claimed in the now abandoned copending applications of one of us, Christian R. Sporck, Serial No. 160,264, filed December 18, 1961, and Serial No. 240,440, filed concurrently herewith, both applications being assigned to the same assignee as the present application. These Sporck applications are incorporated by reference into the present application for purposes of describing the detailed method of preparing the cyclotrisiloxanes. These cyclotrisiloxanes and cyclotetrasiloxanes are made in general by effecting reaction between (1) a methylalkyldichlorosilane such as methylethyldichlorosilane, methylpropyldichlorosilane or dimethyldichlorosilane and (2) either tetraphenyldisiloxanediol-1,3 or hexaphenyltrisiloxanediol-1,5.

The ordered copolymers of the present invention are prepared by the rearrangement and condensation of one of the cyclotetrasiloxanes or cyclotrisiloxanes within the scope of Formula 2. When the rearrangement and condensation involves the reaction of a cyclotetrasiloxane within the scope of Formula 2, for example, a cyclotetrasiloxane within the scope of one of Formulae 3, 4 or 5, the resulting product is an ordered copolymer containing the following recurring structural units:

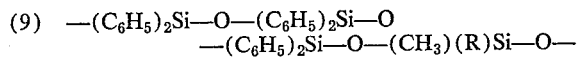

(9) —(C$_6$H$_5$)$_2$Si—O—(C$_6$H$_5$)$_2$Si—O
   —(C$_6$H$_5$)$_2$Si—O—(CH$_3$)(R)Si—O— where R is as previously defined.

The rearrangement and condensation of one of the cyclotrisiloxanes within the scope of Formula 2, for example, one of the cyclotrisiloxanes of Formula 6, 7 or 8, results in the formation of an ordered copolymer consisting essentially of recurring units having the formula:

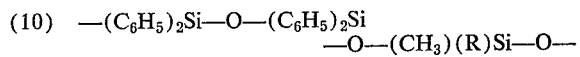

(10) —(C$_6$H$_5$)$_2$Si—O—(C$_6$H$_5$)$_2$Si
   —O—(CH$_3$)(R)Si—O— where R is as previously defined.

The rearrangement and condensation of the cyclic polydiorganosiloxanes of Formula 2 to an ordered copolymer having recurring structural units within the scope of Formula 1 can be effected in either the presence or absence of catalyst. When effecting the rearrangement and condensation in the absence of the catalyst, the cyclic polydiorganosiloxane of Formula 2 is heated to a temperature of from about 300 to 375° C. and maintained at this elevated temperature for a time sufficient to effect the rearrangement and condensation to a polymer having the desired molecular weight. In general, rearrangement and condensation at these elevated temperatures can be effected in times which vary from a few minutes up to several hours or more. However, this thermal rearrangement and condensation presents certain heat transfer problems in connection with the heating of the entire mass of cyclic material to the desired temperature so that in the preferred embodiment of our invention the rearrangement and condensation is effected in the presence of a catalyst.

The catalytic rearrangement and condensation of the cyclic polydiorganosiloxanes of Formula 2 to form one of the ordered copolymers having the recurring structural units of Formula 1 can be effected with any of the conventional alkaline organopolysiloxane rearrangement and condensation catalysts. Among the many alkaline rearrangement and condensation catalysts which can be employed may be mentioned, for example, the hydroxides of alkali metals such as sodium hydroxide, potassium hydroxide, rubidium hydroxide, and cesium hydroxide as well as other basic materials which contain an alkali metal ion; and alkali metal alkoxides such as lithium, potassium, sodium, rubidium or cesium alkoxides where the alkoxy group in the alkoxide is methyl, ethyl, propyl, isopropyl, butyl, hexyl, etc. In addition, the corresponding alkali metal thioalkoxides are useful alkaline rearrangement and condensation catalysts. Additional alkaline rearrangement and condensation catalysts include potassium napthalene and the quaternary phosphonium hydroxides and alkoxides of the type disclosed and claimed in Patent 2,883,366—Kantor et al. Another class of satisfactory alkali metal catalysts are the various alkali metal silanolates such as are described in Patent 2,587,636—MacMullen, Patent 2,634,252—Warrick, and Patent 2,634,284—Hyde.

One preferred group of alkaline catalysts for the rearrangement and condensation of the cyclic polydiorganosiloxanes of Formula 2 are the various alkali metal hydroxides dissolved or dispersed in various cyclic polydiorganosiloxanes. The preferred specific catalyst is a solution or dispersion of potassium hydroxide in octamethylcyclotetrasiloxane, such as, for example, a solution containing from about 0.01 to 1 percent potassium hydroxide.

The amount of alkaline rearrangement and condensation catalyst employed can vary within wide limits. In general, however, where the alkaline catalyst contains an alkali metal ion it is preferred to use a sufficient amount of the alkaline catalyst to provide from about 10 to 1,000 parts by weight of the alkaline metal per million parts of the cyclic polydiorganosiloxane. Where a quaternary phosphonium compound is used, this material is employed in an amount equal to from about 0.001 to 0.1%, by weight, based on the weight of the cyclic polydiorganosiloxane.

The catalytic rearrangement and condensation of the cyclic polydiorganosiloxanes of Formula 2 can be effected at temperatures as low as room temperature, i.e., temperatures of the order of 25° C., up to temperatures of the order of about 170° C. or higher. However, it is most convenient to effect the catalytic rearrangement and condensation at a temperature above the melting point of the cyclic polydiorganosiloxane, so as to insure uniform dispersion of the catalyst in the cyclic polydiorganosiloxane without the use of solvents for the cyclopolysiloxane.

Where the rearrangement and condensation is effected at a temperature below the melting point of the cyclic polydiorganosiloxane, it is preferable to conduct the reaction in the presence of a solvent which is inert to the reactants under the conditions of the reaction so as to facilitate dispersion of the catalyst in the cyclic material. Suitable solvents include, for example, tetrahydrofuran, toluene, xylene, mesitylene, diphenyl ether, etc. Since the solvent is removed after the termination of the rearrangement and condensation reaction, it is preferred to use only the minimum amount of solvent necessary to dissolve the cyclic material, e.g., from about 0.5 to 1.0 part by weight solvent per part of the cyclic polydiorganosiloxane. After the rearrangement and condensation reaction is completed, the solvent is then stripped from the reaction mixture, preferably under reduced pressure.

When the rearrangement and condensation reaction is to be effected in the absence of a solvent for the cyclotrisiloxanes of Formulae 6, 7 or 8, convenient reaction temperatures vary upwards from about 90° C. Convenient reaction temperatures for rearrangement and condensation of the cyclotetrasiloxanes of Formulae 3, 4 or 5 without solvent vary upwards from about 120° C. When the rearrangement and condensation catalyst is one of the quaternary phosphonium compounds mentioned above, the maximum temperature for the rearrangement and condensation reaction is about 125° C., because above this temperature the quaternary phosphonium compound decomposes and loses its activity. With any of the other aforementioned alkaline rearrangement and condensation catalysts, the rearrangement and condensation can be effected at temperatures up to about 170° C. or higher.

After heating the cyclic polydiorganosiloxane of Formula 2 or solution thereof to the temperature at which rearrangement and condensation is to be effected, the rearrangement and condensation catalyst is added to the cyclic material, the mixture is stirred and allowed to remain at temperature until the desired degree of polymerization is obtained. The time required for the rearrangement and condensation can vary within extremely wide limits. However, it is found that the rearrangement and condensation reaction of the present invention is very rapid and the cyclic polydiorganosiloxane is converted to a high molecular weight ordered polymer within the first five to twenty minutes of the reaction at temperatures of from about 120 to 130° C. While the polymerization is substantially complete at this time, it is often preferred to maintain the reaction mixture at the reaction temperature for a time up to several hours, e.g., 2 to 20 hours, or more, so as to increase the molecular weight of the resulting material.

The diorganosiloxane polymers of the present invention have been described previously as high molecular weight materials which are ordered copolymers. These polymers contain both diphenylsiloxane units and either dimethylsiloxane units or other methylalkylsiloxane units. As is apparent from Formula 1, the polymers contain more diphenylsiloxane units than either dimethylsiloxane units or other methylalkylsiloxane units. Thus, when the subscrip $n$ in Formula 1 is equal to 0, there are present in the polymer two diphenylsiloxane units per other siloxane unit. When the subscript $n$ of Formula 1 is equal to 1, there are present three diphenylsiloxane units per other diorganosiloxane unit.

The fact that the polymers of the present invention contain more diphenylsiloxane units than the dimethyl or methylalkylsiloxane units, is important to thermal stability, particularly in oxidizing atmospheres, and to irradiation resistance of the polymers. However, the most important and unique characteristic of these polymers is high tensile strength without intractability. This characteristic is the result of the order in which the various siloxane units appear in the polymer chain. The order of these siloxane units is apparent from Formulae 1, 9, and 10. In the polymer of Formula 9, each dimethylsiloxane unit or other methylalkylsiloxane unit is separated from each other of such units by three diphenylsiloxane units. In the polymer of Formula 10, each dimethylsiloxane unit or other methylalkylsiloxane unit is separated from each other of such units by two diphenylsiloxane units. This separation of the dimethylsiloxane units or other methylalkylsiloxane units from each other by a regular number of diphenylsiloxane units gives the polymer materials of the present invention their unique characteristics. The presence of the isolated dimethylsiloxane units or other methylalkylsiloxane units in these polymers is confirmed by infrared analysis. The fact that the polymers of the present invention are ordered is confirmed by the presence of the isolated dimethylsiloxane units or other methylalkylsiloxane units, by the fact that the polymers of the present invention crystallize reversibly upon stretching and by the fact that these polymers have stress-strain characteristics, X-ray diffraction patterns and optical characteristics of ordered polymers.

As is apparent from an examination of Formulae 9 and 10, there are a number of different polymers within the scope of the present invention. This difference is a function of whether the polymer contains four silicon atoms in the repeating unit as shown in Formula 9, or whether the polymer contains three silicon atoms in the repeating unit as shown in Formula 10. In general, it can be stated that the higher the silicon-bonded phenyl content, the greater the irradiation resistance of the polymer. It can also be stated that the polymers containing only three silicon atoms in the repeating unit exhibit slightly increased flexibility, particularly at low temperatures, over materials containing four silicon atoms in the repeating unit. All other things being equal, it is found that the polymers within the scope of Formula 9 and Formula 10 are affected by the nature of the R group in the polymer. Where the R group is ethyl or n-propyl or isopropyl, the polymers exhibit increased flexibilty at Dry Ice temperatures over corresponding polymers in which the R group is methyl. Where the R group is propyl, the polymer does not exhibit as high a resistance to oxidative degradation at elevated temperatures, as when the R group is methyl or ethyl.

As previously mentioned, the polymers of the present invention are "high polymers." By high polymers is meant a polymer having a molecular weight of at least about ten thousand, using the criteria set forth at page 21 of Fundamental Principles of Polymerization by G. F. D'Alelio, John Wiley & Sons, Inc., New York (1952). For the polymer of Formula 9 this high molecular weight corresponds to at least about 15 of the recurring units of Formula 9. For the polymeric material of Formula 1, this molecular weight corresponds to at least about 21 of the units of Formula 10. While the present invention contemplates all high polymers having molecular weights of at least about 10,000 in the preferred embodiment of out invention the minimum molecular weight is of the order of at least 50,000 to 75,000, which corresponds to from about 75 to 125 of the recurring units of Formula 1. There is no critical upper limit to the molecular weight of the polymers of the present invention, but as a practical matter the polymer need not have molecular weights in excess of about 5,000,000, which corresponds to about 7500 units of Formula 9 or 11,000 units of Formula 10. In terms of the intrinsic viscosity of these polymers as measured in toluene at 30° C., this corresponds to an intrinsic viscosity of from about 0.2 to 4.0, and preferably from about 0.4 to 4.0 deciliters per gram.

The ordered copolymers of the present invention are clear, translucent gums which are soluble in benzene and toluene. These gums differ from conventional silicone gums in that they exhibit an unusually high tensile strength of from about 400 to 2000 p.s.i. in the cured unfilled state. This is in contrast to polydimethylsiloxane gums and polymethylphenylsiloxane gums which exhibit tensile strengths of only about 50 to 100 p.s.i. in the cured, unfilled state.

Because of the high phenyl content of those ordered polymers of the present invention which contain only methyl and phenyl groups attached to silicon, cross-linking or curing with conventional chemical free-radical cross-linking agents is not feasible. Instead, these polymers are best cross-linked by ionizing radiation. Because the high phenyl content makes the ordered copolymers resistant or insensitive to irradiation doses which normally cross-link many types of silicone gums, such as dimethyl silicone gums, the dosage employed in the irradiation cross-linking is significantly higher than the dosage which is usual in the art. However, the method of irradiation is substantially identical to that described and claimed in Patent 2,763,609 Lawton et al., which method comprises irradiating the ordered copolymers to the desired dose with electrons having energies of the order of from about 50,000 to 20,000,000 electron volts or with other sources of ionizing irradiation. In general, the irradiation dose required by this class of ordered copolymers of the present invention is from about $10 \times 10^6$ to $1000 \times 10^6$ roentgens.

Those ordered copolymers within the scope of Formula 1 in which R is ethyl or propyl can be cross-linked with conventional organoperoxide vulcanizing agents such as benzoyl peroxide, di-alpha-cumyl peroxide, tertiary butyl perbenzoate, etc. These peroxides are employed in an amount of from 1.0–10.0 percent by weight of polymer at temperatures of 100–175° C.

The cross-linking of the ordered copolymers of the present invention can be effected in either the presence or the absence of fillers. The fillers which can be employed as reinforcing agents or extenders are the same as those fillers commonly employed in the preparation of other types of silicone rubber. Among the fillers which are useful for this purpose are the various silica fillers such as silica aerogel, fume silica and precipitated silica, as well as other types of fillers such as titanium dioxide, calcium silicate, ferric oxide, chromic oxide, cadmium sulfide, asbestos, glass fibers, calcium carbonate, carbon black, lithopone, talc, etc. Preferably, the filler is one of finely divided silica fillers mentioned above.

The amount of filler can vary over an extremely wide range with satisfactory silicone rubbers being obtained from mixtures of the ordered copolymer and the filler containing from 20 to 300 parts by weight filler per 100 parts by weight of the ordered copolymer. In preparing silicone rubber from the ordered copolymers and filler, the ingredients are milled together in a conventional rubber mill and the milled product is cured by the procedure previously described.

The filled silicone rubbers resulting from the conversion of the ordered copolymers of the present invention to the solid, elastic, cured state have the high thermal stability and resistance to ionizing irradiation which is common to high phenyl-containing silicone elastomers and in addition have a markedly improved tensile strength over prior art materials. This tensile strength is generally one and one-half to two times greater than the tensile strength of conventional silicone rubbers and is of the order of from about 1500 to 2000 pounds per square inch. This high tensile strength makes these silicone rubbers useful in all of those applications where conventional silicone rubbers are useful and particularly useful in those applications where the combination of thermal stability, irradiation resistance and high tensile strength are required. For example, these silicone rubbers are useful as shock mounts for apparatus which is to be subjected to high physical stresses at elevated temperatures, are useful in the manufacture of structural components to be used in atomic piles, are useful in applications such as seals for automotive transmissions, and are useful as insulation for electrical conductors.

It should be emphasized that the ordered polymers of the present invention have extremely high tensile strengths in the unfilled state. This means that these gums can be cross-linked in the absence of filler to produce unfilled rubbers which are useful for many of the applications in which prior art filled silicone rubbers have been employed.

The following examples are illustrative of the practice of our invention and are not intended for purposes of limitation. All parts are by weight.

*Example 1*

To a reaction vessel were added 6.0 parts of 1,1-dimethyl-3,3,5,5-tetraphenylcyclotrisiloxane, which had a melting point of about 88° C., and 0.05 part of a 1% dispersion of potassium hydroxide in octamethylcyclotetrasiloxane. The reaction vessel was evacuated at a pressure of $10^{-4}$ millimeters and the contents were heated to 110° C. and maintained at this temperature for 16 hours, during which time the contents of the reaction mixture were converted from a liquid to a thick gum. At the end of this time the reaction vessel was cooled to room temperature and 0.1 part methyl iodide was added to neutralize the potassium hydroxide catalyst and 20 parts of benzene was added to dissolve the product. The benzene solution of the product was added to 200 parts of methanol and 2.75 parts of a tough, white elastic gum precipitated. This gum consisted essentially of recurring units having the formula:

(11)    $-(C_6H_5)_2Si-O-(C_6H_5)_2Si-O(CH_3)_2Si-O-$

This gum had an intrinsic viscosity of 3.10 deciliters per gram in toluene at 30° C. Chemical analysis of the gum showed the presence of 66.8% carbon and 6.1% hydrogen as compared with the theoretical values of 66.4% carbon and 5.6% hydrogen. Infrared analysis of a sample of the gum showed the presence of diphenylsiloxane units and isolated dimethylsiloxane units as indicated by a strong infrared peak at 11.85 microns. The infrared curve contained no peaks corresponding to the original cyclotrisiloxane ring. This gum had a molecular weight of 3,000,000 which corresponds to a polymer having an average of about 6400 of the units of Formula 10 per molecule. An X-ray diffraction pattern of this gum indicated order and the gum exhibited marked birefringence on stretching.

*Example 2*

The procedure of Example 1 was repeated except that the catalyzed 1,1-dimethyl-3,3,5,5-tetraphenylcyclotrisiloxane was maintained at 110° C. for only forty minutes. This resulted in a gum chemically and physically identical to that of Example 1 except that it had an intrinsic viscosity in toluene at 30° C. of 4.02 and a molecular weight of the order of five million. This corresponds to an average of about 11,000 of the units of Formula 10 per molecule.

*Example 3*

Samples of the gum prepared in Example 2 were cross-linked by irradiation with 800 kilovolt peak electrons. With irradiation to a dose of $50 \times 10^6$ roentgens, a cross-linked silicone rubber having a tensile strength of about 350 p.s.i. at an elongation rate of 20 inches per minute and an elongation of about 500% was obtained. With irradiation to a dose of $100 \times 10^6$ roentgens, a cross-linked unfilled rubber having a tensile strength of 500 pounds per square inch and an elongation of 375% was obtained at an elongation rate of 20 inches per minute. When a sample of the gum of Example 2 filled with 50 parts by weight of precipitated silica filler per 100 parts of gum is irradiated to a dose of $100 \times 10^6$ roentgens, a silicone rubber having a tensile strength in excess of 1000 pounds per square inch and an elongation in excess of 300% is obtained.

*Example 4*

To a reaction vessel were added 7.5 parts of 1,1-dimethyl-3,3,5,5-tetraphenylcyclotrisiloxane which was heated to 100° C. The reaction vessel was evacuated to a pressure of 10 microns to remove any entrained air and moisture. To the molten material in the reaction vessel was added 1.0 part of a 0.4% solution of potassium hydroxide in octamethylcyclotetrasiloxane and stirring was effected for a few seconds. During this time the viscosity of the material in the reaction vessel increased to a point where the stirrer stopped. At the end of 15 minutes, a tough, translucent gum was obtained. This gum had the same infrared and X-ray characteristics as the gum produced in Example 1 and had an intrinsic viscosity of 1.45 deciliters per gram in toluene at 30° C. which corresponded to a molecular weight of about 500,000. Following the procedure of Example 2, this gum is converted to a cross-linked silicone rubber by high energy electron irradiation in either the presence or the absence of filler.

*Example 5*

To a reaction vessel were added 60 parts of 1,1-dimethyl-3,3,5,5,7,7 - hexaphenylcyclotetrasiloxane, which had a melting point of 115–116° C., and 0.5 part of a 1% dispersion of potassium hydroxide in octamethylcyclotetrasiloxane. The reaction vessel was evacuated at a pressure of 10⁻⁴ millimeters to remove any entrained air and moisture and then the reaction mixture was heated to a temperature of 125° C. and maintained at this temperature for 60 minutes, during which time the contents of the reaction vessel were converted from a liquid to a tough, elastic gum flexible at room temperature and soluble in benzene and toluene. To this gum was added 1.0 part methyl iodide to neutralize the potassium hydroxide and 200 parts of benzene to dissolve the gum. The benzene solution was added to 2000 parts of methanol from which the gum precipitated. This gum had an intrinsic viscosity of 1.50 deciliters per gram in toluene at 30° C. Infrared analysis of this gum showed the presence of the isolated dimethylsiloxane unit and showed that the ratio of diphenylsiloxane units to dimethylsiloxane units in this gum was greater than the ratio of these two types of siloxane units in the gum of Example 1. Chemical analysis of this gum showed the presence of 67.9% carbon and 5.6% hydrogen as compared with the theoretical values of 68.4% carbon and 5.4% hydrogen. The molecular weight of this gum was approximately 700,000, indicating that an average molecule of the gum consisted essentially of about 1040 of the recurring structural units having the formula:

(12) —(C₆H₅)₂Si—O—(C₆H₅)₂Si—O—
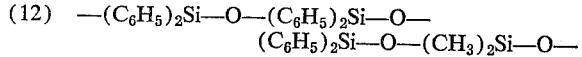

*Example 6*

Following the procedure of Example 2, samples of the gum of Example 5 were subjected to 800 kilovolt peak electrons and irradiated to a dose of 100×10⁶ roentgens. An unirradiated sample of this gum exhibited a tensile strength of 94 pounds per square inch and an elongation in excess of 1700% at an elongation rate of 0.2 inch per minute. At the same elongation rate, the irradiated gum had a tensile strength of 1240 pounds per square inch and an elongation of 450%. With an elongation rate of 20 inches per minute, the irradiated gum showed a tensile strength of 1990 pounds per square inch and 405% elongation.

*Example 7*

To a reaction vessel were added 10 parts of 1-methyl-1-ethyl-3,3,5,5-tetraphenylcyclotrisiloxane, which had a melting point of 75–76° C. The vessel was heated to a temperature of 125° C. and evacuated to a pressure of 20 microns. To the reaction mixture was then added 0.05 part of a 0.4% dispersion of potassium hydroxide in octamethylcyclotetrasiloxane and stirring was effected for a few seconds. At the end of 15 minutes, the reaction mixture was allowed to return to room temperature yielding a tough, translucent gum consisting essentially of recurring units having the formula:

(13) —(C₆H₅)₂Si—O—(C₆H₅)₂Si—O
—(CH₃)(C₂H₅)Si—O—

This gum had an intrinsic viscosity of 2.3 deciliters per gram in toluene at 30° C. which corresponds to a molecular weight in excess of 1,000,000. This gum is converted to a cross-linked silicone rubber by irradiation with high energy electrons to a dose of 100×10⁶ roentgens to produce a silicon rubber having a tensile strength in excess of 1,000 pounds per square inch.

*Example 8*

To a reaction vessel were added 8 parts of 1-methyl-1-n-propyl-3,3,5,5-tetraphenylcyclotrisiloxane, which had a melting point of 67–68° C., and 0.04 part of a 0.4% dispersion of potassium hydroxide in octamethylcyclotetrasiloxane. The reaction vessel was evacuated to a pressure of about 15 microns and then heated at a temperature of 125° C. for 15 minutes during which time the crystalline starting material was converted to a tough translucent gum consisting essentially of the following recurring structural units:

(14) —(C₆H₅)₂Si—O—(C₆H₅)₂Si—O
—(CH₃)(C₃H₇)Si—O—

This gum had an intrinsic viscosity of 1.8 deciliters per gram in toluene at 30° C. which corresponds to a molecular weight greater than about 700,000. Following the procedure of Example 7, this gum is converted to a cross-linked silicone rubber having a tensile strength in excess of 1,000 pounds per square inch.

*Example 9*

To a reaction vessel were added 5 parts of 1-methyl-1-ethyl-3,3,5,5,7,7-hexaphenylcyclotetrasiloxane, which had a melting point of 90–91° C., and a sufficient amount of 0.4% dispersion of potassium hydroxide in octamethylcyclotetrasiloxane to provide 20 parts potassium hydroxide per million parts of the cyclotetrasiloxane. The reaction vessel was evacuated to a pressure of 25 microns and heated at a temperature of 140° C. and maintained at this time for two hours, during which time the starting material was converted to a tough translucent gum consisting essentially of the following recurring structural units:

(15) —(C₆H₅)₂Si—O—(C₆H₅)₂Si—O
—(C₆H₅)₂Si—O—(CH₃)(C₂H₆)Si—O—

This gum had an intrinsic viscosity of 0.70 deciliters per gram in toluene at 30° C. Following the procedure of Example 7, this gum was converted to a cross-linked silicone rubber having a tensile strength in excess of 1500 p.s.i.

*Example 10*

To a reaction vessel were added 10 parts of 1-methyl-1-n-propyl-3,3,5,5,7,7-hexaphenylcyclotetrasiloxane, which had a metling point of 87–88.2° C., and 0.05 part of a 0.4% dispersion of potassium hydroxide in octamethylcyclotetrasiloxane. The reaction vessel was evacuated to a pressure of 10 microns and heated to a temperature of 140° C. and maintained at this temperature for two hours. At the end of this time, the starting material had been converted to a tough diorganopolysiloxane gum consisting of recurring structural units having the formula:

(16) —(C₆H₅)₂Si—O—(C₆H₅)₂Si—O
—(C₆H₅)₂Si—O—(CH₃)(C₃H₇)Si—O—

This gum had an intrinsic viscosity of 0.60 deciliter per gram in toluene at 30° C. Following the procedure of Example 7, this gum was converted to a cross-linked silicone rubber having a tensile strength in excess of 1500 pounds per square inch.

While the foregoing description and examples have described the preparation of high molecular weight ordered copolymers consisting of a single recurring unit within the scope of Formulae 1, 9 or 10, it should be understood that in some cases it is desirable to prepare copolymers containing more than one recurring structural unit, such as two or more of the structural units of Formula 9 or two or more of the structural units of Formula 10. Additionally, in other cases, it is desirable that the high molecular weight ordered copolymer contain both one or more of the units of Formula 9 and one or more of the units of Formula 10. Where it is desirable that the ordered copolymer contain more than one of the several units within the scope of one or both of Formulae 9 and 10, such a copolymer is prepared by the simultaneous rearrangement and condensation of a mixture of two or more of the cyclopolysiloxanes within the scope of Formula 2. For example, a copolymer can be prepared by the simultaneous rearrangement and condensation of a mixture of 1,1-dimethyl-3,3,5,5,7,7-hexaphenylcyclotetrasiloxane and 1,1-dimethyl-3,3,5,5-tetraphenylcyclotrisiloxane. In addition, any one or more of the cyclopolysiloxanes of Formula 2 can be copolymerized with one or more additional cyclopolydisiloxanes to form unique products. Furthermore, the high molecular weight ordered copolymers within the scope of the present invention can be blended with other polydiorganosiloxanes and the blend cured, for example, by irradiation to a dose of the order of 50 to $100 \times 10^6$ roentgens.

Among the many cyclic materials which can be copolymerized with the cyclic materials of Formula 2 and which can be used to form polymeric materials for blending with the polymers of the present invention may be mentioned, for example, 1,1-diethyl-3,3,5,5-tetraphenylcyclotrisiloxane, 1,1 - dibutyl-3,3,5,5,7,7 - hexaphenylcyclotetrasiloxane, 1-methyl-1-propyl-3,3,5,5-tetraphenylcyclotrisiloxane, hexaphenylcyclotrisiloxane, octaphenylcyclotetrasiloxane, hexamethylcyclotrisiloxane, or octamethylcyclotetrasiloxane; triphenylsiloxy pentaphenylcyclotrisiloxane or triphenylsiloxy heptaphenylcyclotetrasiloxane which are described and claimed in the copending application of Christian R. Sporck, Ser. No. 160,263, vinylpentaphenylcyclotrisiloxane or vinylheptaphenylcyclotetrasiloxane which are described and claimed in the copending application of Christian R. Sporck, Ser. No. 160,268; 1-methyl-1-vinyl-3,3,5,5 - tetraphenylcyclotrisiloxane or 1-methyl-1-vinyl-3,3,5,5,7,7-hexaphenylcyclotetrasiloxane which are described and claimed in the copending application of Christian R. Sporck, Ser. No. 160,269; compounds such as p-chlorophenylheptaphenylcyclotetrasiloxane, 1,1-bis-(p-chlorophenyl)-3,3,5,5-tetraphenylcyclotrisiloxane or 1-methyl-1-p-chlorophenyl-3,3,5,5-tetraphenylcyclotrisiloxane which are described and claimed in the copending application of Christian R. Sporck, Ser. No. 160,265; compounds such as beta-cyanoethylpentaphenylcyclotrisiloxane and 1,1-bis-(gamma-cyanopropyl) - 3,3,5,5,7,7 - hexaphenylcyclotetrasiloxane which are described and claimed in the copending application of Christian R. Sporck, Ser. No. 160,271; a compound such as 1,1-bis-(m-trifluoromethylphenyl)-3,3,5,5-tetraphenylcyclotrisiloxane which is described and claimed in the copending application of Christian R. Sporck, Ser. No. 160,272; methylpentaphenylcyclotrisiloxane and methylheptaphenylcyclotetrasiloxane which are described and claimed in the copending application of Christian R. Sporck, Ser. No. 160,270; cyclic materials containing both siloxane linkages and silphenylene linkages, which are described and claimed in the copending application of Christian R. Sporck, Ser. No. 160,262. All of the above-mentioned applications were filed Dec. 18, 1961, and assigned to the same assignee as the present invention.

When forming copolymers from the cyclotetrasiloxanes or cyclotrisiloxanes of Formula 2, the reactions between the various cyclopolysiloxanes are effected by the same procedure employed in preparing the polymeric materials of the present invention which consist essentially of the recurring structural units of Formula 9 or Formula 10.

As mentioned earlier, because of the high phenyl content and the isolated dimethylsiloxane units in those high molecular weight diorganopolysiloxanes of the present invention which contain only dimethyl and diphenylsiloxane units, these materials are extremely difficult to cross-link employing conventional free-radical catalysts. However, these polymers can be readily modified so as to enable cross-linking with these conventional organoperoxide vulcanizing agents. This modification is effected by forming copolymers which contain a plurality of the recurring structural units of Formula 11 or Formula 12 together with diorganosiloxane units which are more readily cross-linked by free-radical catalysts. Thus, copolymers can be prepared from a major proportion, for example, from 80 to 90% by weight of the cyclic materials of Formula 3 or 6 together with from 1 to 20% of a cyclic polydiorganosiloxane containing silicon-bonded vinyl groups or a cyclopolysiloxane containing at least 2 adjacent dimethylsiloxane groups. The preparation of such copolymers and their cross-linking by conventional organoperoxide vulcanizing agents is illustrated in Examples 11 and 12, which follow.

Example 11

A mixture was prepared of 12 parts of 1,1-dimethyl-3,3,5,5-tetraphenylcyclotrisiloxane and 0.48 part of 1-methyl - 1 - vinyl - 3,3,5,5 - tetraphenylcyclotrisiloxane and heated to a temperature of 110° C. The mixture was evacuated at a pressure of 25 microns and 0.5 part of a 0.01% dispersion of potassium hydroxide in octamethylcyclotetrasiloxane was added. At the end of 20 minutes, the resulting mixture had polymerized to a high molecular weight gum which contained one vinyl group per 25 siloxane units. A sample of this gum (4.85 parts) was milled with 0.28 part of di-alpha-cumyl peroxide and press cured at 200° C. for 15 minutes with a post-cure for 16 hours at 200° C. The resulting cross-linked rubber had an elongation of 300% and a tensile strength of 1300 p.s.i.

Example 12

About 0.9 part of the copolymer prepared in Example 11, 0.1 part of fume silica and 0.01 part of a polydimethylsiloxane gum and 0.003 part of t-butyl perbenzoate were milled together and press-cured at 275° C. for 15 minutes and post-cured for 16 hours at 200° C. to yield a silicone rubber having a tensile strength of 1200 pounds per square inch and an elongation of 520%.

In addition to forming copolymers which contain a plurality of the recurring structural units of Formula 11 or Formula 12 together with other diorganosiloxane units as illustrated in Examples 11 and 12, it is often desirable to form copolymers which contain the recurring units of Formula 9 or Formula 10, where R is ethyl or propyl, with recurring units derived from one or more other cyclic polydiorganosiloxanes to produce novel products. Thus, copolymers can be prepared from a major portion, for example, from 80 to 99 percent by weight of the cyclic materials of Formula 9 or 10, where R is ethyl or propyl, together with from one to 20 percent of a second cyclic polydiorganosiloxane. The preparation of such copolymers is described in Examples 13 and 14, which follow.

Example 13

A mixture was formed of 4.0 parts 1-methyl-1-ethyl-3,3,5,5-tetraphenylcyclotrisiloxane and 0.27 part 1-methyl-1-vinyl-3,3,5,5-tetraphenylcyclotrisiloxane and evacuated to a pressure of 15 microns. The mixture was then heated to 125° C. in the presence of a sufficient amount of 0.4% dispersion of potassium hydroxide in octamethylcyclotetrasiloxane to provide 20 parts potassium hydroxide per million parts of the cyclotrisiloxanes. The mixture was maintained at this temperature for 15 minutes during which time a copolymer was formed which consisted of both recurring structural units of Formula 13 as well as recurring structural units having the formula:

(17)
$$—(C_6H_5)_2Si—O—(C_6H_5)_2Si—O—(CH_3)(C_2H_3)Si—O—$$

These two types of recurring structural units were present in the same proportion as the starting cyclotrisiloxanes. This gum had an intrinsic viscosity of 2.40 deciliters per gram in toluene at 30° C. A silicone rubber was prepared by mixing 1.5 parts of this copolymer with 0.6 part diatomaceous earth and 0.017 part of 40% di-alpha-cumyl peroxide in an inert carrier. This mixture was milled, press-cured for 5 minutes at 340° F. and then oven-cured for 2 hours at 200° C. The resulting silicone rubber had a tensile strength of 1700 pounds per square inch and an elongation of 300 percent.

Example 14

Into a reaction vessel were charged 12.7 parts 1-methyl-1-n-propyl-3,3,5,5-tetraphenylcyclotrisiloxane and 1.1 part of 1-methyl-1-vinyl-3,3,5,5 - tetraphenylcyclotrisiloxane and the reaction vessel was evacuated to a pressure of 20 microns. The reaction vessel was then charged with a sufficient amount of a 0.4% dispersion of potassium hydroxide in octamethylcyclotetrasiloxane to provide 20 parts potassium hydroxide per million parts of the cyclotrisiloxanes and the reaction mixture was maintained at a temperature of 125° C. for 15 minutes. During this time, the reaction mixture was converted to a copolymer containing both recurring units of Formula 14 and the recurring units of Formula 17 in the proportions present in the starting materials. This copolymer had an intrinsic viscosity of 1.20 deciliters per gram in toluene at 30° C. This gum was converted to a silicon rubber by milling 3 parts of the gum with 1.2 part fumed silica and 0.17 part of 40% di-alpha-cumyl peroxide in an inert carrier and heated for 5 minutes at 370° F. in a press and 2 hours at 200° C. in an oven. This resulted in a crosslinked silicone rubber having a tensile strength of about 1500 pounds per square inch.

What we claim as new and desire to secure by Letters Patent of the United States is:

1. A benzene and toluene soluble diorganopolysiloxane having a molecular weight of at least about ten thousand and consisting essentially of the following recurring structural units:

$$-(C_6H_5)_2Si-O-(C_6H_5)_2Si-O-(C_6H_5)_2Si-O-(CH_3)(R)Si-O-$$

where R is an alkyl radical selected from the class consisting of methyl, ethyl, and propyl.

2. A benzene and toluene soluble diorganopolysiloxane having a molecular weight of at least about ten thousand and consisting essentially of the following recurring structural units:

$$-(C_6H_5)_2Si-O-(C_6H_5)_2Si-O-(C_6H_5)_2Si-O-(CH_3)_2Si-O-$$

References Cited by the Examiner
UNITED STATES PATENTS

| | | | |
|---|---|---|---|
| 2,883,366 | 4/1959 | Kantor et al. | 260—46.5 |
| 2,994,684 | 8/1961 | Johannson | 260—46.5 |
| 3,002,951 | 10/1961 | Johannson | 260—46.5 |
| 3,122,579 | 2/1964 | Leitheiser | 260—46.5 |

LEON J. BERCOVITZ, *Primary Examiner.*

MURRAY TILLMAN, WILLIAM H. SHORT,
*Examiners.*

M. I. MARQUIS, *Assistant Examiner.*